United States Patent Office 3,494,811
Patented Feb. 10, 1970

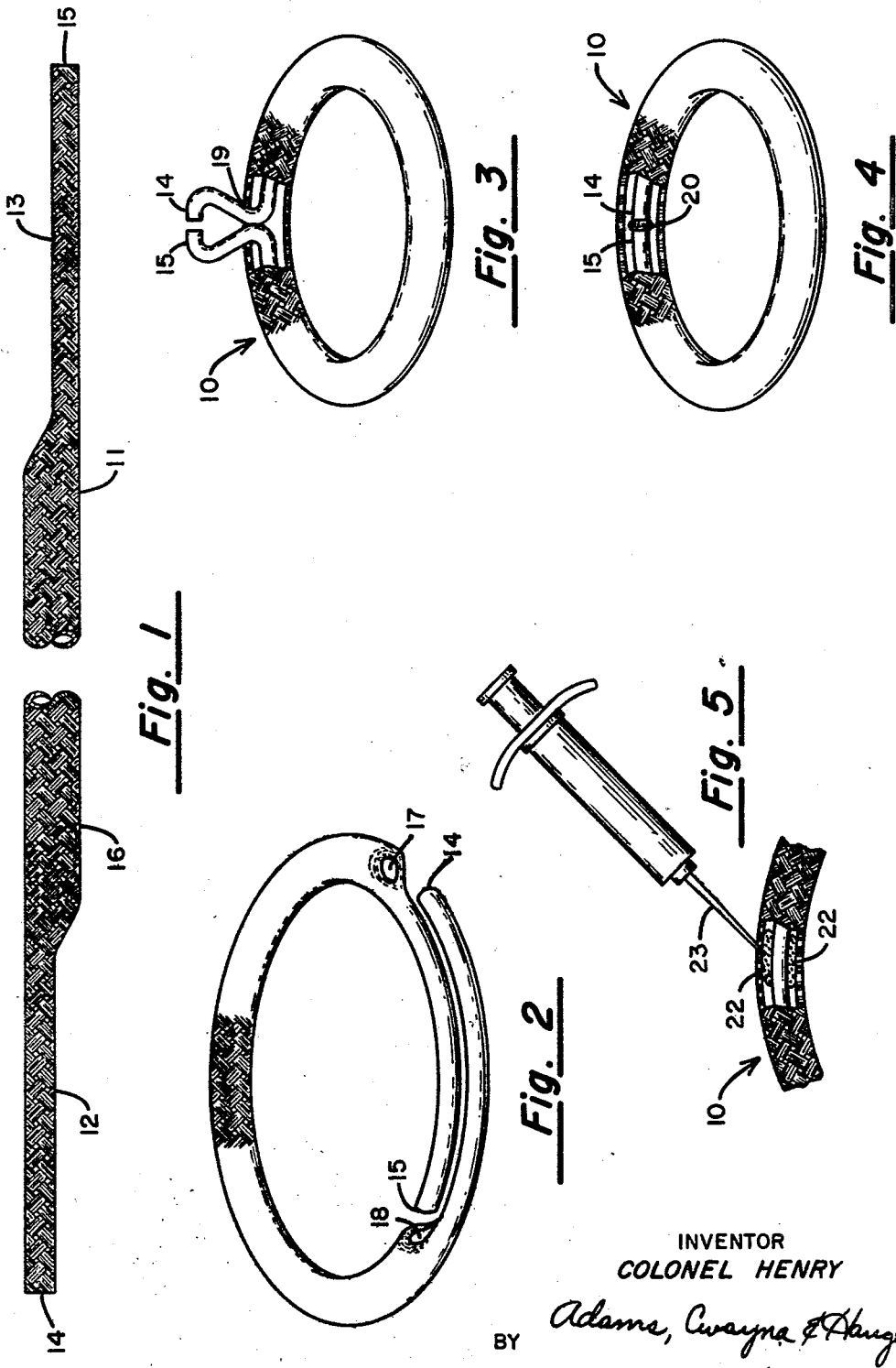

3,494,811
METHOD OF MAKING CLOSED LOOP STRUCTURES
Colonel Henry, Lawton, Iowa 51030
Filed Aug. 2, 1967, Ser. No. 658,004
Int. Cl. B32b *1/00, 27/02*
U.S. Cl. 156—122       7 Claims

ABSTRACT OF THE DISCLOSURE

A method of preparing closed loop toroidal structures from a unit length of hollow braided line, wherein the individual ends of the line are turned upon themselves, and forced between the individual strands of the braid into the core of the annular braid of hollow line and thereafter bonded together.

---

An improved technique for the preparation of toroidal members or structures, and specifically a technique for the preparation of such structures which appear to be formed in a closed loop pattern, these structures having specific adaptations for use as an item of jewelry such as a wrist bracelet or the like, as well as for a teething ring for babies. When utilized as a teething ring, the structure may be injected with a suitable or required medicinal substance for slow release to the child, the loop structure having substantial closed areas to retain or hold the medicinal substance in its interstices. The texture of the structure is such that it can be easily chewed or gummed by a child.

Toroids, fabricated from an annular braid of rope, can be made to have the appearance of a substantially closed loop structure. These members, if prepared by conventional preparation techniques, will provide a device having a closed woven loop pattern or structure sealed along its circumference. As such, these devices are expensive to prepare and are not exceptionally strong, and consequently could not reasonably be expected to be utilized as low-cost items of jewelry, teething rings, or the like. In accordance with the technique of the present invention, however, a technique is provided which will enable the preparation of strong toroidal members resistant to severing at the juncture and having the appearance of a closed loop structure, the assembly being readily prepared from individual unit lengths of hollow braided line or rope. Hollow braided line or rope is commercially available today, the line comprising a plurality of strands forming an annular braid with a hollow core. These commercially available ropes include material fabricated from polyethylene, polypropylene, or the like, each of these materials having the property of heat-sealing. In other words, both materials are thermo-plastic in nature and may be readily heat sealed. In the preparation of these materials they are normally woven in a loose braid each of the braids comprising a plurality of individual strands made up of a plurality of filaments. When placed under tension, the rope has the property of decreasing its diameter substantially, and thereby reducing the available inner core. If the individual unit lengths of thermo-plastic braided hollow core ropes are placed under tension and while being held under tension contacted with a heated knife or the like, the material forming the braid will fuse together at the ends, and thereby form a flat cut-off portion of relatively small diameter.

Relating these features to the technique of the present invention, a closed loop structure is prepared from a unit length of hollow braided line each of the individual lengths of line with each length having its ends preferably formed in a sealed cut-off disposition, these ends also preferably being of relatively small diameter. The unit lengths of the line are then placed in a quasi-loop configuration, by turning the individual ends of the lengths of line back upon the main length. The main body of the individual unit lengths of line are then compressed to open, divide or part the strands forming the braid at points which are spaced from the ends by a distance equal to substantially one-fourth of the length of the line. These sealed ends are then inserted into the core of the line through the individual strands forming the braid at these specific points, each end being inserted into the braid at the one-fourth length point which is most closely adjacent the oppositely disposed end of the line lengths. After the ends have been inserted in the line, they are driven into the annular area of the hollow core until the compressed or sealed ends substantially meet within the hollow line, thus forming a generally double walled torus. Preferably, the individual ends are driven into the closed line for substantially equal distances to form the structure. In addition, in order to form a more uniform closed loop structure, the individual ends are inserted into the braid forming the line along oppositely disposed points along the surface of the circumference of the length of line. Therefore, in other words, as the unit length is formed in a quasi-circular form, one end of the loop will be inserted between the braids along the outer circumference of the quasi-loop structure while the other end portion will be inserted into the braid along the inner circumference of the quasi-loop structure. The completed unit is one which has an appearance which is generally indistinguishable from that of a continuous or closed loop structure per se. Subsequently, the ends are removed from the core at a common point or break in the braid, and while removed are fused back while on opposite sides of a heated blade. The blade is removed with the ends being held in oppositely disposed relationship, the ends then being forced together to form a bond between the individual ends.

Therefore, it is an object of the present invention to provide an improved technique for preparing a bracelet in the form of a closed loop structure from a unit length of hollow braided line.

It is a further object of the present invention to prepare a toroidal structure or the like from a unit length of hollow braided line, wherein the individual ends of the line are turned upon themselves, and forced between the individual strands into the core of the annular braid of hollow line and thereafter bonded together.

It is a yet a further object of the present invention to provide an improved technique for preparing structures of toroidal form, wherein the structures are fabricated from a unit length of hollow line, and capable of withstanding substantial applied tensile forces.

Other and further objects of the present invention will become apparent to those skilled in the art upon a study of the following specification, appended claims, and accompanying drawing wherein:

FIGURE 1 is a plan view of a segment of hollow braided rope prepared for fabrication of a closed loop structure therefrom, the end portions of the braided rope having been stressed in tensile in order to minimize or reduce the diameter thereof, the central portion being unstressed in order to provide a maximum diameter, the center portion also having a portion of its central segment shown as being removed;

FIGURE 2 is a perspective view of the line shown in FIGURE 1 at a further step in the process of preparing a closed loop bracelet therefrom;

FIGURE 3 is a perspective view of the partially completed closed loop element, a portion of the structure being cut away in order to expose the internal arrangement to view and showing the ends removed through a common point along the circumference of the structure;

FIGURE 4 is a perspective view of the completed closed loop element, a portion of the structure being cut away in order to expose the internal bonding arrangement to view; and FIGURE 5 is a partial perspective view of the structure showing the core being injected or partially filled with a jelly-like material through a hollow needle injection device.

In accordance with the preferred modification of the present invention, the loop generally designated 10 is formed in a closed structure, the device being fabricated from a unit length of hollow braided line. The line is comprised of a plurality of individual strands forming an annular braid with a hollow core, such as is shown in FIGURE 1 of the drawing. This unit length of hollow braided line comprises a central portion or segment 11 and end portions or segments 12 and 13. The filaments at the end portions 12 and 13 are preferably bonded together in a unit by sealing at their cutoff terminals, such as at 14 and 15 respectively. Extruded polyolefin filaments, such as polyethylene or polypropylene, as well as extruded nylon filaments are capable of being bonded together and are commercially available. The individual filaments are formed in groups, a group of such filaments making up a strand, with the strands being ultimately braided into a hollow annular braided rope. Braided rope of this type is commercially available.

After the assembly has been started, as shown in FIGURE 1, the length of the line is turned upon itself, as shown in FIGURE 2, and the sealed cutoff end portions are then inserted into the core of the annular braid through the opening formed in the spread apart individual strands forming the braid, such as is shown at 17 and 18. These areas of insertion are spaced from the adjacent sealed ends by a distance which is equal to substantially one-fourth of the length of the entire segment. Thereafter, these individual ends are then driven into the body of the hollow annular line through these openings until the sealed ends approach one another or come into substantial contact, one with another. At this point, particular attention is directed to FIGURE 3 of the drawing wherein the individual ends 14 and 15 are withdrawn from the core structure through a separate opening, such as at 19, this opening being formed by spreading apart the individual strands forming the braid.

When the device is in the configuration as shown in FIGURE 3, the individual end faces 14 and 15 are placed in oppositely disposed relationship to a heated blade or the like, the blade being permitted to fuse-back the ends 14 and 15, and thereupon the blade is removed from its position between the individual ends 14 and 15. These ends are then forced together into physical contact, one with another, in order to form a fusion bond such as is shown at 20 in FIGURE 4. At this point, the operator applies tension to the outer winding of the structure and thereby brings these fused ends back into the braided structure, such as is shown in FIGURE 4.

The hollow braided line as previously indicated, is available in a variety of colors and combinations of colors. With this availability, it is possible to provide a multitude of colors in a finished product, such as a bracelet or the like.

It will be noted that the ends of the unit length of hollow braided line are indicated as being sealed. The purpose of this is to avoid the presence of loose filaments which can interfere with the expeditious production of a closed loop. If these ends are sealed, such as by utilizing a hot knife as a cut-off element, there will be no tendency for the individual filaments to unravel, or become otherwise separated, one from another. Furthermore, this expedites insertion of the individual sealed ends into the opening formed in the strands, such as is shown at 17 and 18, during the formation of the closed loop.

As an alternative, these individual ends can be bonded together by a suitable adhesive, where a compatible adhesive is available for the material forming the loop structure.

With particular attention being directed to FIGURE 5, it will be seen that the loop structure 10 is capable of receiving an injection of a jelly-like fluid substance or the like 22 by means of a suitable hollow needle injection element 23. Of course, a dipping process could be utilized as well, the individual filaments having a substantial tendency to attract and retain liquids by surface tension phenomena. Thus, the hollow ring structure may be employed as a teething ring and as such may be a receptacle for a medicinal, therapeutic, or nourishing substance. When the loop structure is fabricated from appropriate materials, it can be readily rendered non-toxic.

The individual strands are formed from a plurality of filaments. Since the hollow braid has this construction, any tension applied across the closed loop will cause a compression of the outer sleeve portion onto the inner portions formed from the end portions 12 and 13. This compressive force assists in retaining the loop in its closed configuration and renders the product extremely strong and durable.

I claim:

1. The method of preparing a closed loop structure from a unit length of hollow braided line, the line comprising a plurality of strands forming an annular braid with a hollow core, said method comprising:
    (a) forming a sealed cut-off portion at each of the terminal ends of said length of hollow line;
    (b) turning the terminal ends of said length of line toward the center thereof;
    (c) inserting said sealed ends into the core of said hollow braided line between individual strands forming the braid in a direction toward the individual end to form a single loop, the insertion being accomplished at points along the length of hollow braided line spaced from the adjacent sealed ends by a distance equal to substantially one-fourth of the total length of said line;
    (d) driving each of said sealed ends into said hollow line to a common point;
    (e) forming a common opening in the outer periphery of said hollow braided line at said common point to permit removal of said ends therefrom;
    (f) removing said terminal ends from said common opening to expose the terminal ends, and bonding the terminal ends together; and
    (g) drawing the bonded ends into the core of said hollow braided line through said common opening.

2. The method as set forth in claim 1 being particularly characterized in that said insertion of the sealed ends into the core between strands forming the braid is accomplished at points which are located on substantially oppositely disposed radial surface locations along the circumference of said length of line.

3. The method as set forth in claim 1 being particularly characterized in that said points of insertion are spaced substantially equally from the terminal ends of the unit length of line.

4. The method as set forth in claim 2 being particularly characterized in that said insertion points are disposed along the inner circumferential area and outer circumferential area respectively.

5. The method as set forth in claim 1 being particularly characterized in that said strands are formed of polyethylene filaments.

6. The method as set forth in claim 1 being particularly characterized in that said strands are made up of a plurality of filaments.

7. The method of preparing a teething ring from a unit length of hollow braided line, the line comprising a plurality of strands of a polyolefin selected from the group consisting of polyethylene and polypropylene, and forming an annular braid with a hollow core, said method comprising:

(a) forming a sealed cut-off portion at each of the terminal ends of said length of hollow line;
(b) turning the terminal ends of said length of line toward the center thereof;
(c) inserting said sealed ends into the core of said hollow braided line between individual strands forming the braid in a direction toward the individual end to form a single loop, the insertion being accomplished at points along the length of hollow braided line spaced from the adjacent sealed ends by a distance equal to substantially one-fourth of the total length of said line;
(d) driving each of said sealed ends into said hollow line to a common point;
(e) forming a common opening in the outer periphery of said hollow braided line at said common point to permit removal of said ends therefrom;
(f) removing said terminal ends from said common opening to expose the terminal ends, and bonding the terminal ends together;
(g) drawing the bonded ends into the core of said hollow braided line through said common opening; and
(h) applying a palatable substance to said teething ring structure.

References Cited

UNITED STATES PATENTS 3,087,847   4/1963   Brugger et al. _____ 156—122

BENJAMIN A. BORCHELT, Primary Examiner

STEPHEN C. BENTLEY, Assistant Examiner

U.S. Cl. X.R.

156—145, 198, 217, 257